United States Patent
Zierle et al.

(10) Patent No.: US 7,404,579 B2
(45) Date of Patent: Jul. 29, 2008

(54) ARRANGEMENT FOR THE STEP-BY-STEP HEIGHT ADJUSTMENT OF A HOLDING OR DEFLECTING FITTING OF A SEAT BELT ON A HOLLOW BODY PART OF A MOTOR VEHICLE

(75) Inventors: Matthias Zierle, Filderstadt (DE); Juergen Ohnmacht, Gemmingen (DE); Markus Osswald, Walddorf-Haeslach (DE)

(73) Assignee: Dr. Ing. h.c.f. Porsche Aktiengesellschaft, Stuttgart (DE)

( * ) Notice: Subject to any disclaimer, the term of this patent is extended or adjusted under 35 U.S.C. 154(b) by 291 days.

(21) Appl. No.: 11/041,939

(22) Filed: Jan. 26, 2005

(65) Prior Publication Data
US 2005/0189758 A1    Sep. 1, 2005

(30) Foreign Application Priority Data
Jan. 27, 2004    (DE)    ............. 10 2004 003 966

(51) Int. Cl.
B60R 22/06    (2006.01)
(52) U.S. Cl. .................. 280/804; 297/468; 297/472
(58) Field of Classification Search ............. 280/804; 297/468, 473, 470, 471, 482, 472
See application file for complete search history.

(56) References Cited

U.S. PATENT DOCUMENTS

| | | | | |
|---|---|---|---|---|
| 4,738,470 A | * | 4/1988 | Matsui et al. | 280/804 |
| 4,850,610 A | * | 7/1989 | Asagiri et al. | 280/804 |
| 4,878,692 A | * | 11/1989 | Ando et al. | 280/804 |
| 4,898,402 A | * | 2/1990 | Igarashi et al. | 280/804 |
| 4,909,541 A | * | 3/1990 | Tokugawa | 280/801.2 |
| 4,941,681 A | * | 7/1990 | Sasaki | 280/804 |
| 4,993,745 A | * | 2/1991 | Ono | 280/804 |
| 4,995,640 A | * | 2/1991 | Saito | 280/804 |
| 5,044,664 A | * | 9/1991 | Mogi | 280/804 |

(Continued)

FOREIGN PATENT DOCUMENTS

DE    19615804 A1    10/1997

(Continued)

Primary Examiner—Toan To
(74) Attorney, Agent, or Firm—Crowell & Moring LLP

(57) ABSTRACT

An arrangement for step-by-step height adjustment of a holding or deflecting fitting of a seat belt on a hollow body part of a motor vehicle, particularly on a B-column or a C-column, includes a guide rail mounted on the body part, and a carriage which can be displaced along the guide rail, which can be fixed in defined adjusting positions, and which has a fastening device for the holding or deflecting fitting. The guide rail, which is arranged behind a column covering, is mountable on the vehicle body part by way of two mutually spaced fastenings. In the event of a vehicle collision, particularly a side impact, the forces acting upon a vehicle occupant's head are to be kept below a permissible limit value. Accordingly, it is provided that, in the event of a vehicle occupant's head impact onto the holding or deflecting fitting, starting from a defined force level, the guide rail and therefore the entire belt height adjusting arrangement, while absorbing energy, is laterally swivellable about an axis of rotation formed by one of two fastenings of the guide rails and extending in the transverse direction of the vehicle.

7 Claims, 4 Drawing Sheets

U.S. PATENT DOCUMENTS

| | | | |
|---|---|---|---|
| 5,232,245 A * | 8/1993 | Gorney et al. | 280/804 |
| 5,280,959 A * | 1/1994 | Nanbu | 280/808 |
| 6,334,629 B1 * | 1/2002 | Griesemer et al. | 280/801.2 |
| 6,615,461 B2 * | 9/2003 | Suyama | 24/633 |

FOREIGN PATENT DOCUMENTS

| | | | |
|---|---|---|---|
| DE | 19719572 A1 | 11/1997 |
| DE | 19630498 A1 | 2/1998 |
| DE | 19615804 C2 | 12/1998 |
| DE | 19822696 A1 | 11/1999 |

* cited by examiner

ARRANGEMENT FOR THE STEP-BY-STEP HEIGHT ADJUSTMENT OF A HOLDING OR DEFLECTING FITTING OF A SEAT BELT ON A HOLLOW BODY PART OF A MOTOR VEHICLE

This application claims the priority of German application 10 2004 003 966.6, filed Jan. 27, 2004, the disclosure of which is expressly incorporated by reference herein.

BACKGROUND AND SUMMARY OF THE INVENTION

The present invention relates to an arrangement for the step-by-step height adjustment of a holding or deflecting fitting of a seat belt on a hollow body part of a motor vehicle, particularly on a B-column or C-column, having a guide rail mounted on the body part, and a carriage which can be displaced along the guide rail, can be fixed in defined adjusting positions and has a fastening device for the holding or deflecting fitting, and in which the guide rail, which is arranged behind a column covering, is mountable on the vehicle body part by means of two mutually spaced fastenings.

Arrangements of the initially mentioned type, which are usually called belt height adjusting devices, are used for adapting the height of the deflecting or fastening point of a seat belt to the body size of a vehicle occupant to be protected. In four-door passenger cars, the belt height adjusting arrangements are normally mounted in the upper part of the B- and C-columns. For adjusting the height of a fitting, usually by pressure onto a cover cap of a screw connecting the holding or deflecting fitting with the carriage, a carriage is pressed against the force of a spring in the direction of the column, in order to release the fixing caused by mutual detent engagement of detent elements of the carriage and of a guiding rail, so that the carriage can be moved along the guide rail into the desired adjusting position. When the cover cap is subsequently relieved from pressure, the detent elements again enter into a mutual detent engagement, so that the carriage is held in the selected adjusting position.

Many such arrangements are known from the prior art. Reference is made, for example, to German Patent Document DE 198 22 696 A1.

There is a risk that a motor vehicle occupant's head will carry out a transverse motion and impact on an area in which the deflecting fitting is arranged when lateral forces act upon a vehicle equipped with the deflecting fitting in the event of an accident, for example. In this case, loads which are above a permissible limit value may act upon the vehicle occupant's head.

It is known from German Patent Document DE 197 19 572 A1 to arrange a deformation element, which is designed for absorbing energy in the event of pressure admission to the seat belt linkage point, between the seat belt linkage point and the vehicle body part. Viewed in the transverse direction of the vehicle, such a deformation element requires a relatively large amount of additional space.

It is known from German Patent Document DE 196 15 804 C2 to arrange a damping device between the adjusting part holding the deflecting fitting and the vehicle body part at which a rail is fastened or can be fastened. When impact-caused forces act upon the deflecting fitting, the damping device is supported on the adjusting part and the vehicle body part and can be deformable during the process for damping impact energy. A corresponding space has to be provided for housing such a damping device.

It is an object of the invention to further develop a fastening for a belt height adjusting arrangement according to the above-mentioned type such that, in the event of a head impact onto the holding or deflecting fitting, loads acting upon the vehicle occupant's head are below the permissible limit value.

According to the invention, this object is achieved by having the guide rail and therefore an entire belt height adjusting arrangement, while absorbing energy, be laterally swivellable, starting from a defined force level, about an axis of rotation, formed by one of two fastenings of the guide rail and extending in the transverse direction of the vehicle, upon impact of a vehicle occupant's head with the holding or deflecting fitting. Additional characteristics advantageously further developing the invention are defined by the dependent claims.

Principal advantages achieved by the invention are that, in the event of a head impact onto the holding or deflecting fitting at a defined force level, the belt height adjusting arrangement, while absorbing energy, can be laterally swivelled about an axis of rotation formed by one of the two fastenings of the carrier rail and extending in the transverse direction of the vehicle. Energy is absorbed during swivelling of the belt height adjusting arrangement, and thus the head loads occurring are below the permissible limit value. Furthermore, an additional energy absorption can take place by deformation of the column covering disposed in front.

In one embodiment, the belt height adjusting arrangement swivels about the upper fastening, and specifically, viewed from the vehicle occupant compartment, against the driving direction toward the rear. Thus, while absorbing energy, the belt height adjusting arrangement yields laterally in the longitudinal direction of the vehicle. Energy absorption is formed by a bent-away column-side lug which bends or deforms during the swivelling of the guide rail of the belt height adjusting device. As a result of the geometry of the lug (length, width, thickness, set angle), the force level can be defined, starting from which the lug bends during the swivelling of the guide rail.

The invention will be explained in detail in the following by means of an embodiment illustrated in the drawing.

DETAILED DESCRIPTION OF THE INVENTION

Figure 1:
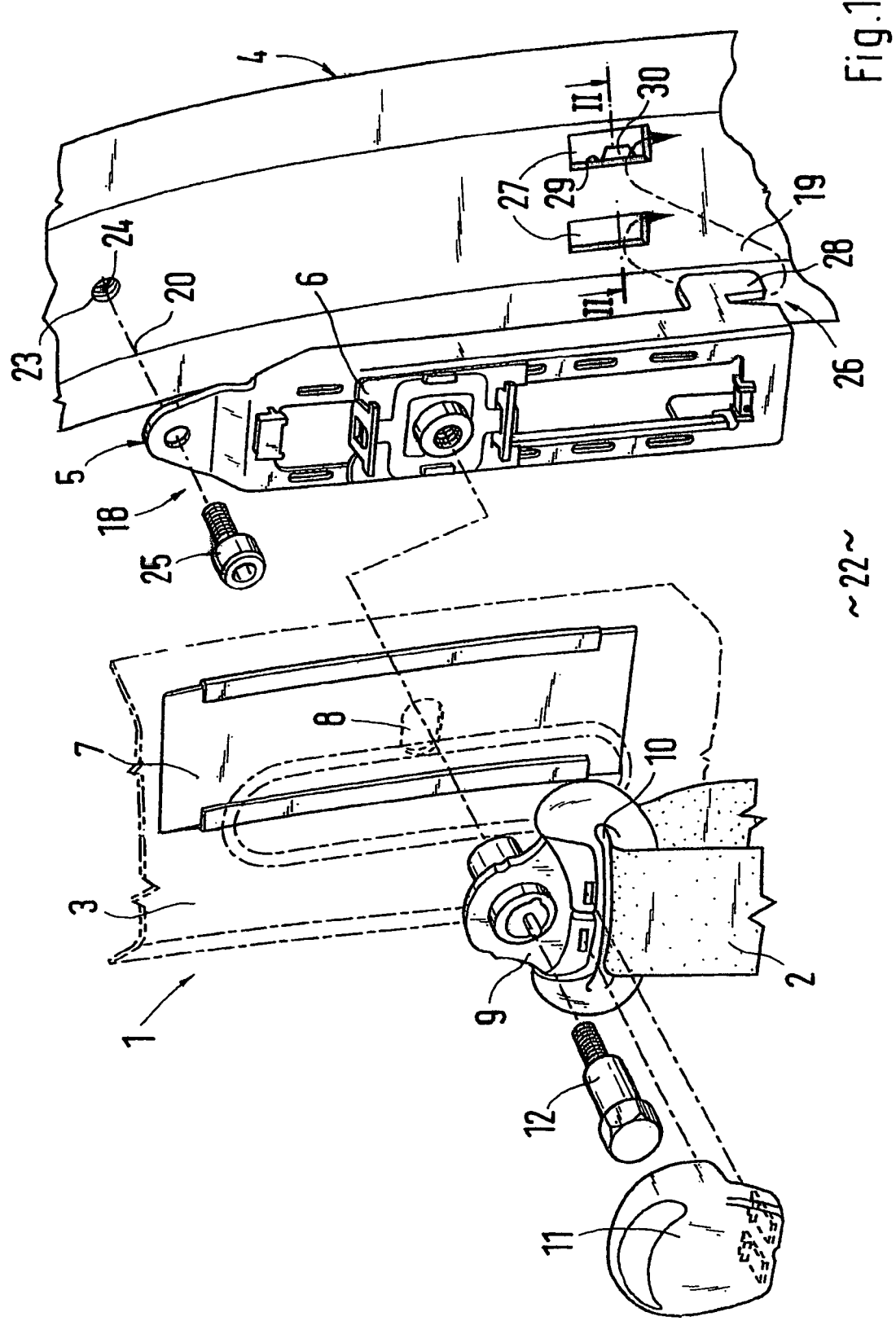
FIG. 1 is an exploded perspective view of a belt height adjusting arrangement according to the invention mounted on a column.

The belt height adjusting arrangement 1 for a seat belt 2 of a passenger car, which is illustrated in the drawing, essentially consists of a guide rail 5 mounted behind a column covering 3 on a column 4 of the passenger car; of a carriage 6 which can be displaced along the guide rail 5 and can be fixed in defined adjusting positions on the guide rail 5; of a slide 7 which is mounted in front of the guide rail 5 above a recess of the column covering 3 and has a passage opening 8; of a holding or deflecting fitting 9 with a guide slot 10 for the seat belt 2, as well as of a holding screw 12 for fastening the holding or deflecting fitting 9 on the carriage, which holding screw 12 penetrates the passage opening 8 of the slide 7 and is covered by a cover cap 11.

Figure 2:
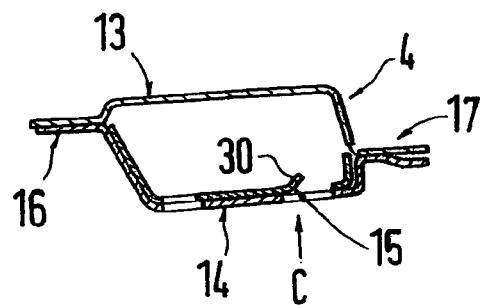
FIG. 2 is an enlarged sectional view of the column as seen along line II-II of FIG. 1.
Figure 3:
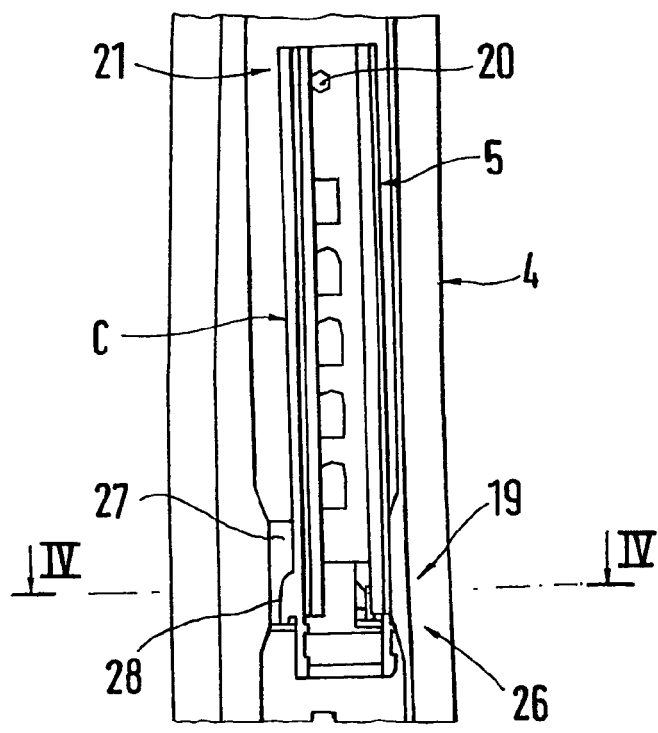
FIG. 3 is a perspective view of the door column with the guide rail in the installed position.

As illustrated in FIG. 2, the section of the B- or C-column 4, which is used as a holding device for the guide rail 5 and, in the cross-section, is illustrated in a simplified trapezoidal manner, consists of a groove-shaped external metal sheet 13, of an internal metal sheet 14 profiled in a hat-shape, and of an internal reinforcing metal sheet 15 fastened to the internal metal sheet 14. The external metal sheet 13 and the internal metal sheet 14 are mutually connected on end-side flanges 16, 17 oriented in the same direction, by means of welding, gluing or the like. Sealing profiles, which are not shown in detail, are fitted onto the flanges 16, 17. In the illustrated embodiment, the column 4 forms the hollow vehicle body part.

The profiled guide rail 5 of the belt height adjusting arrangement 1, which is arranged behind the column covering 3, can be mounted on the column 4 by way of two fastenings 18, 19 extending at a distance from one another viewed in the vertical direction.

According to the invention, it is provided that, in the event of a vehicle occupant's head impact onto the holding or deflecting fitting 9, starting from a defined force level, the guide rail 5 and therefore the entire belt height adjusting arrangement 1, while absorbing energy, is laterally swivellable about an axis of rotation 20 formed by one of the two fastenings 18, 19 of the guide rail 5 and extending in the transverse direction of the vehicle. In the illustrated embodiment, the guide rail 5 is held in position on the column 4 at its upper end 21 by way of a screwed fastening forming the fastening 18, the screwed fastening forming the stationary axis of rotation 20 during the swivelling of the guide rail 5. On the area of the internal metal sheet 14 and of the reinforcing sheet 15 facing the vehicle occupant compartment 22, the screwed fastening has respectively aligned passage bores 23, in which case a screw nut 24 for a screw 25 used for the fastening of the guide rail 5 is welded onto a cavity-side surface of the reinforcing metal sheet 15 (FIG. 1).

At its lower end 26, the guide rail interacts with the column 4 by way of at least one plug-type connection forming the fastening 19. On the column 4, the plug-type connection 19 comprises a pair of spaced vertical longitudinal slots 27 through which one hook-shaped holding tongue 28 respectively of the guide rail 5 can be introduced in order to support the guide rail 5 on the column 4 before it is fastened by means of the screw 25.

Figure 7:
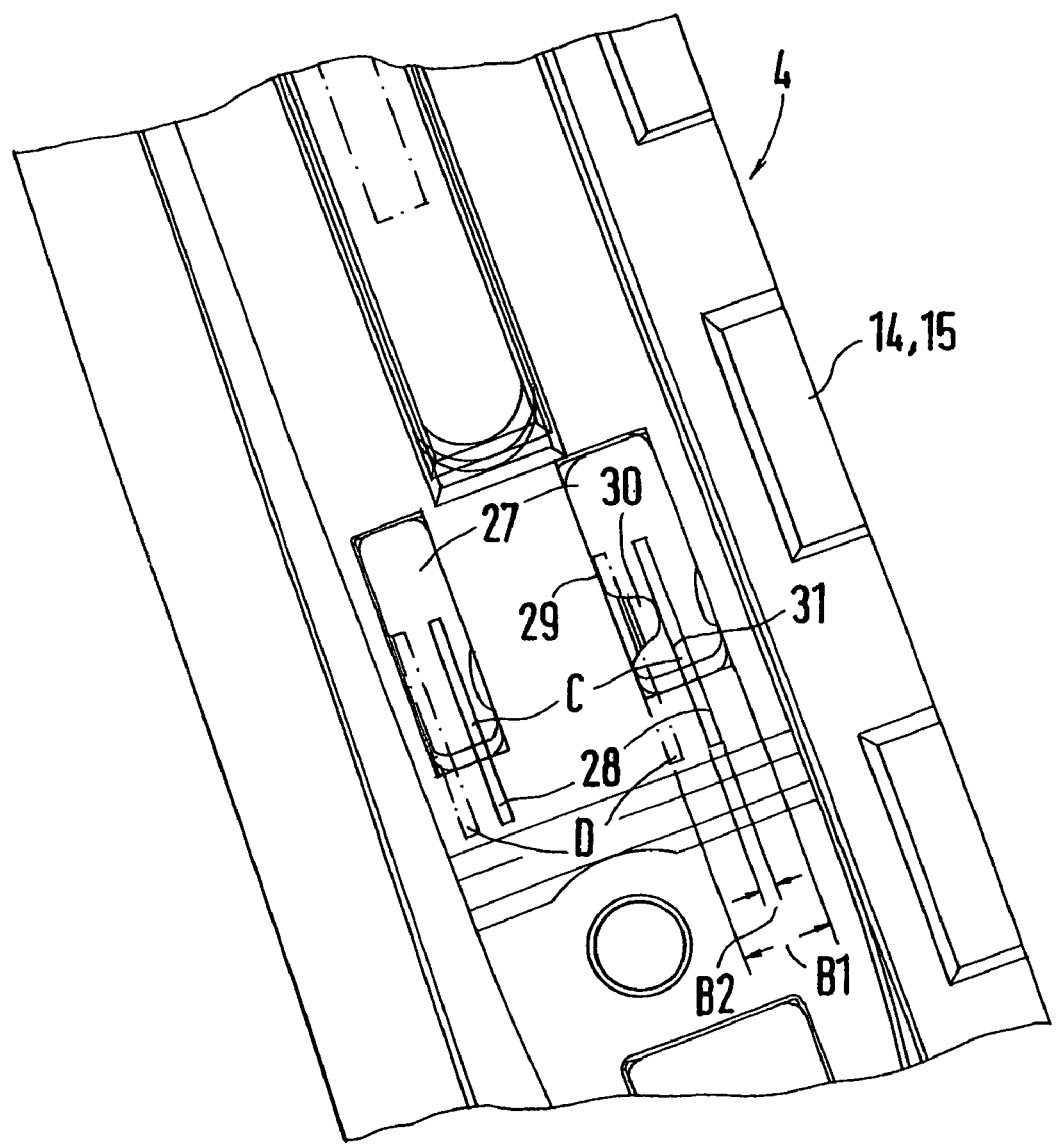
FIG. 7 is a sectional view from the interior onto the door column, the position of the holding tongues being illustrated in both end positions.

Viewed in the longitudinal direction of the vehicle, the longitudinal slots 27 have a significantly greater width B1 than the thickness B2 of the holding tongue 28 (FIG. 7). A projecting bent-away lug 30 is constructed on at least one upright longitudinal side 29 of one of the two longitudinal slots 27 of the column 4, the free end of the lug 30 being supported on the adjoining side wall 31 of the holding tongue 28 of the guide rail 5. In this case, in the event of a head-impact-caused swivelling motion of the guide rail 5, the lug 30 bends or deforms while absorbing energy, that is, by work of deformation.

Figure 4:
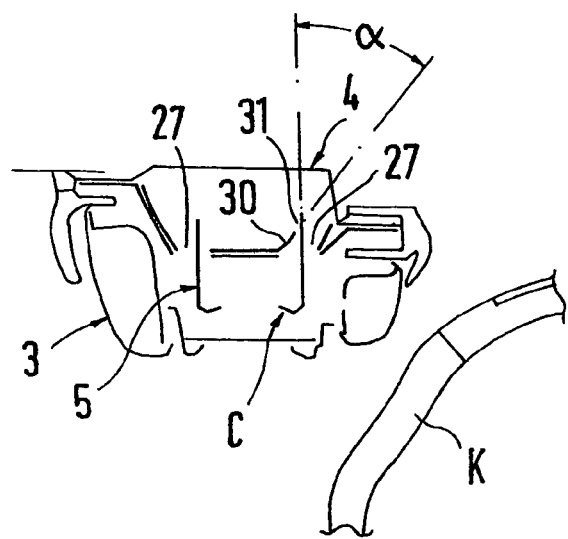
FIG. 4 is a sectional view as seen along line IV-IV of FIG. 3.
Figure 5:
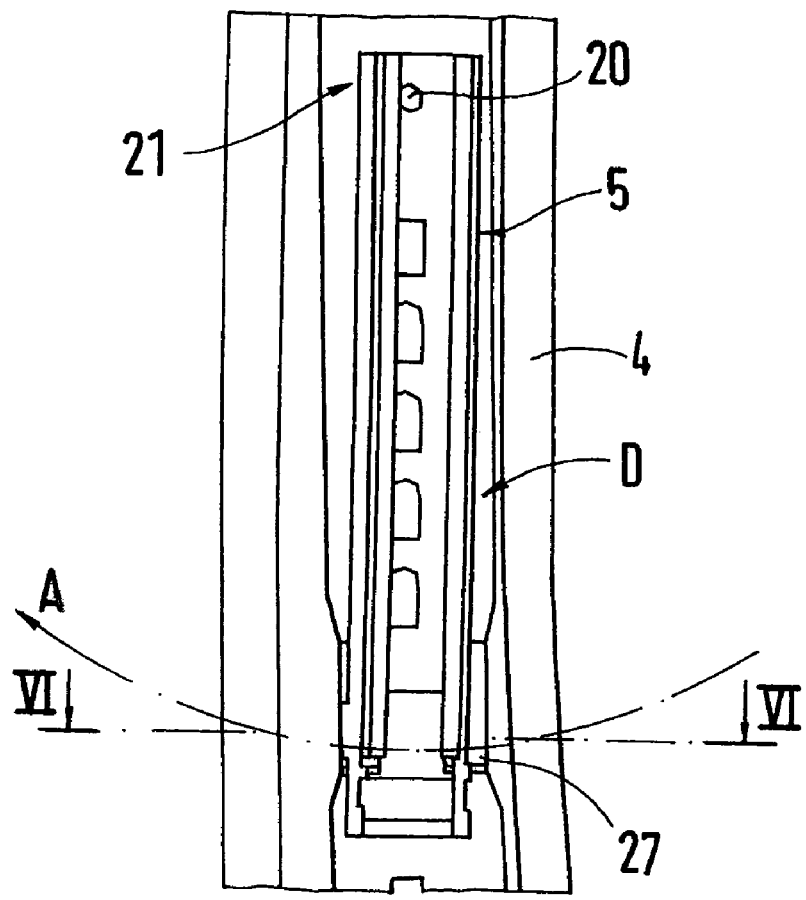
FIG. 5 is a view similar to FIG. 3 but with a swivelled guide rail after a head impact.

In this embodiment, the trapezoidal, semicircular or similarly constructed lug 30 is arranged on an internal reinforcing metal sheet 15 of the column 4. However, it could also be provided on the internal metal sheet 14 of the column 4. In the installed position C of the guide rail 5, the lug 30 extends at an angle a of approximately 45° with respect to the adjoining side wall 31 of the holding tongue 28. In the embodiment, the angle a amounts to approximately 45°; however, it may also be smaller or larger than 45°. The lug 30 is oriented inward into the cavity of the column (FIGS. 2 and 4). When the guide rail 5 is swivelled into its end position D, the lug 30 is bent in the direction of the arrow R and extends approximately parallel to the side wall 31 of the holding tongue 28 (FIG. 6).

In the driving operation, a vehicle occupant's head K extends at a distance from the holding or deflecting fitting 9 of the belt height adjusting arrangement 1 (FIG. 4).

Figure 6:
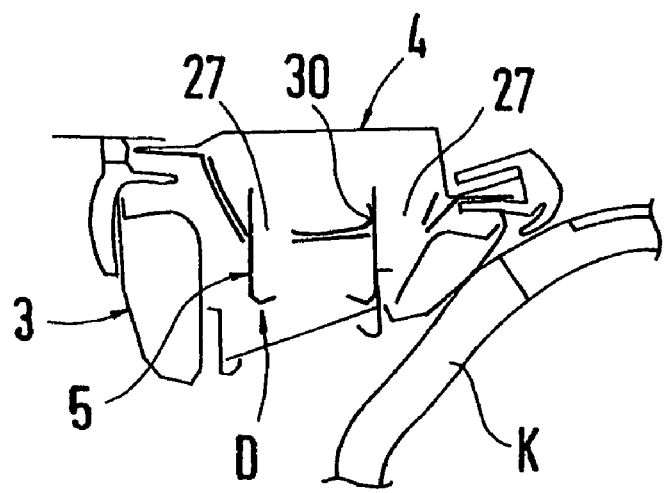
FIG. 6 is a sectional view as seen along line VI-VI of FIG. 5.

In the event of a vehicle collision, in particular, the vehicle occupant's head K may move toward the side in the direction of the belt height adjusting arrangement 1 and then come in contact with the column covering 3 or the holding or deflecting fitting 9 (FIG. 6). By means of the fastening of the guide rail 5 of the belt height adjusting arrangement 1 on the column 4 according to the invention, it is achieved that, in the event of the head impact, energy is absorbed first by the deformation of the column covering 3 and subsequently by the work of deformation during the swivelling of the guide rail 5, so that there is a reliable falling below the permissible limit values for the head impact. During the head impact, the guide rail 5 swivels about the upper axis of rotation 20, which extends in the transverse direction of the vehicle, in the longitudinal direction of the vehicle, specifically in the direction A against the driving direction F of the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. An arrangement for step-by-step height adjustment of a holding or deflecting fitting of a seat belt on a hollow body part of a motor vehicle comprising:
   a guide rail mounted on the body part,
   a carriage which can be displaced along the guide rail, can be fixed in defined adjusting positions, and has a fastening device for the holding or deflecting fitting,
   two mutually spaced fastenings by which the guide rail, which is arranged behind a column covering, is mountable on the body part, the guide rail, at its lower end, interacting with the body part by way of at least one plug connection, the plug connection, at the body part, comprising a pair of spaced vertical longitudinal slots, through which respective hook-shaped holding tongues of the guide rail can be introduced, and the longitudinal slots, viewed in the longitudinal direction of the vehicle, having a width which is significantly greater than a thickness of each holding tongue, and
   a projecting, bent away lug provided at least on one upright longitudinal side of a longitudinal slot, the projecting, bent-away lug having a free end which interacts with an adjacent side wall of the holding tongue, the lug bending while absorbing energy during a swivelling movement of the guide rail about the axis of rotation,
   wherein, starting from a defined force level, the guide rail and therefore an entire belt height adjusting arrangement, while absorbing energy, is laterally swivellable about an axis of rotation formed by one of two fastenings of the guide rail and extending in the transverse direction of the vehicle upon impact of a vehicle occupant's head with the holding or deflecting fitting.

2. The arrangement according to claim 1, wherein the lug is constructed on at least one of an internal reinforcing metal sheet and an internal metal sheet of the body part.

3. The arrangement according to claim 2, wherein, in an installed position of the guide rail, the lug extends at an angle with respect to the side wall of the holding tongue.

4. The arrangement according to claim 1, wherein, in an installed position of the guide rail, the lug extends at an angle with respect to the side wall of the holding tongue.

5. An arrangement for adjustment of a fitting of a seat belt on a hollow body part of a motor vehicle comprising:
   a guide rail mounted on the body part by spaced fastenings,
   a carriage which can be displaced along the guide rail and which can be fixed in defined adjusting positions, the guide rail being laterally swivellable about an axis of rotation formed by one of the spaced fastenings and extending in the transverse direction of the vehicle upon impact of a vehicle occupant's head with the fitting and, at its lower end, interacting with the body part by way of at least one plug connection the plug connection, at the body part, comprises a pair of spaced vertical longitudinal slots, through which respective hook-shaped holding tongues of the guide rail can be introduced, and wherein, viewed in the longitudinal direction of the vehicle, the longitudinal slots have a width which is significantly greater than a thickness of each holding tongue, and
   a projecting, bent away lug provided at least on one upright longitudinal side of a longitudinal slot, the projecting, bent-away lug having a free end which interacts with an adjacent side wall of the holding tongue, the lug bending while absorbing energy during a swivelling movement of the guide rail about the axis of rotation.

6. The arrangement according to claim 5, wherein the lug is constructed on at least one of an internal reinforcing metal sheet and an internal metal sheet of the body part.

7. The arrangement according to claim 5, wherein, in an installed position of the guide rail, the lug extends at an angle with respect to the side wall of the holding tongue.

* * * * *